(12) United States Patent
Mitcham

(10) Patent No.: US 7,339,303 B2
(45) Date of Patent: Mar. 4, 2008

(54) ELECTRICAL MACHINE

(75) Inventor: Alan J Mitcham, Ponteland (GB)

(73) Assignee: Rolls-Royce plc, London (GB)

( * ) Notice: Subject to any disclaimer, the term of this patent is extended or adjusted under 35 U.S.C. 154(b) by 217 days.

(21) Appl. No.: 10/954,268

(22) Filed: Oct. 1, 2004

(65) Prior Publication Data

US 2005/0073216 A1    Apr. 7, 2005

(30) Foreign Application Priority Data

Oct. 3, 2003    (GB) ................................ 0323232.9

(51) Int. Cl.
*H02K 17/16* (2006.01)
*K02K 1/22* (2006.01)

(52) U.S. Cl. ...................... 310/270; 310/211
(58) Field of Classification Search ................ 310/211, 310/212, 270, 271
See application file for complete search history.

(56) References Cited

U.S. PATENT DOCUMENTS 4,885,494 A * 12/1989 Higashi ...................... 505/166
5,444,319 A * 8/1995 Nakamura et al. .......... 310/211
5,719,457 A    2/1998 Helfer
6,534,891 B2 * 3/2003 Kliman et al. ............... 310/211

FOREIGN PATENT DOCUMENTS

GB         704555 P    2/1954
JP         5115162 A   7/1993

* cited by examiner

*Primary Examiner*—Tran Nguyen
(74) *Attorney, Agent, or Firm*—W. Warren Taltavull; Manelli Denison & Selter PLLC

(57) ABSTRACT

An electrical machine incorporates a rotor core assembly (30) wherein the core (33) has rotor bars (31) extending into and secured within slots of end rings (34) either side of the core (33). The core (33) is secured in axial compression upon a shaft (35) by at least inner clamp rings (37). These inner clamp rings (37) include a recess, which in association with a recess in an outer clamp ring (38) forms a cavity to retain a clamp section (36) of the respective end rings (34). The outer clamp ring (38) is secured to the inner clamp ring (37) typically using bolts. Thus, the structural strength of the clamp rings (37, 38) inhibits differential radial growth between the core (33) and the end rings (34) due to thermal, rotational and centrifugal expansion.

11 Claims, 3 Drawing Sheets

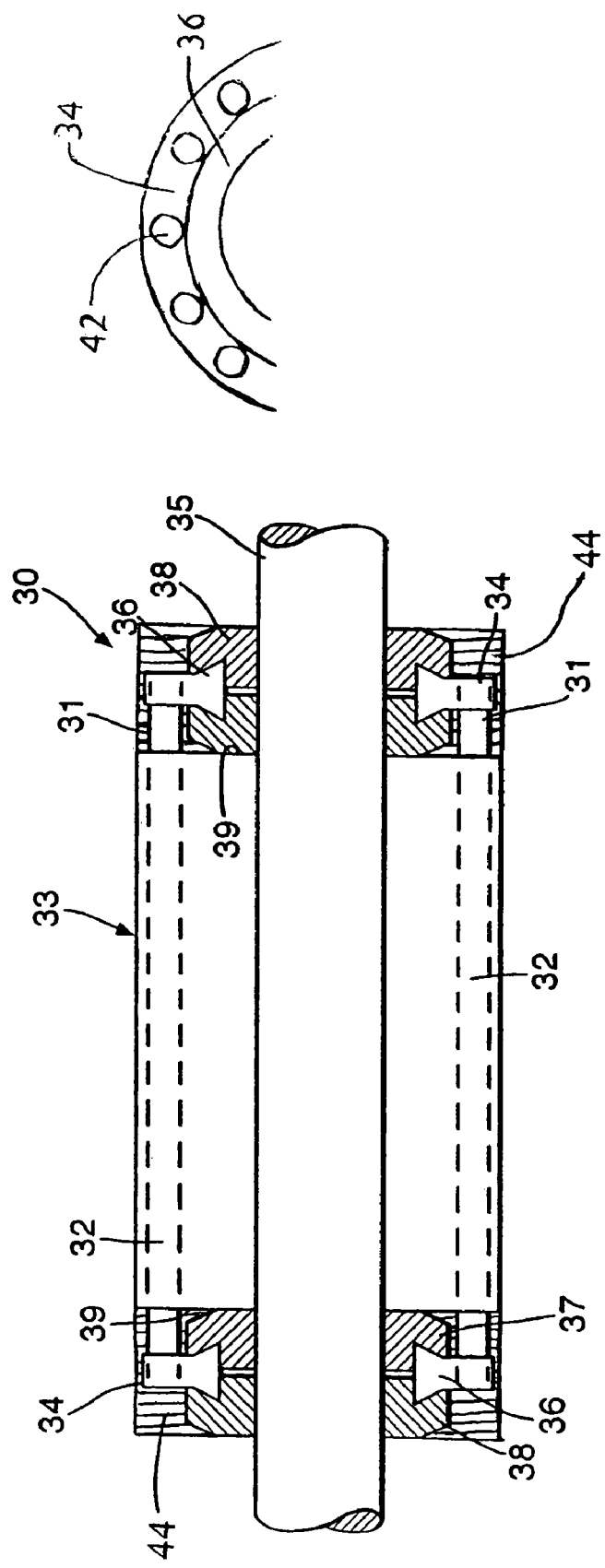

ELECTRICAL MACHINE

FIELD OF THE INVENTION

The present invention relates to an electrical machine and more particularly to the end ring assemblies for a high speed electrical induction generator.

BACKGROUND OF THE INVENTION

Generally, so called squirrel cage electrical induction machines are constructed with a laminated rotor core, copper rotor bars which extend through that core and copper or copper alloy end rings. FIG. 1 illustrates one conventional construction of a squirrel cage electrical induction machine. Thus, rotor bars 1 are located and fitted within slots 2 in a rotor core 3. These rotor bars 1 are usually rectangular or round drawn copper bars. The rotor bars 1 are connected to an end ring 4 that acts to short circuit the rotor bars 1 at each end of the rotor core 3. As can be seen, the rotor 3 is secured about a shaft 5, which in operation rotates.

In high speed applications, the end rings 4 are generally made from high strength copper alloy or copper chrome. Furthermore, in addition to using high strength copper alloy, these end rings 4 may be further reinforced by external banding in the form of carbon fibre over-wraps 6.

There are several technical difficulties encountered in designing high speed induction machine rotors using this approach:
- a) The maximum strength of the available copper alloys (up to 250 MPa) is substantially less than that of the available lamination materials (up to 700 MPa).
- b) The rotor bars 1 are constrained both by their fitment within slots 2 in the rotor core 3 and by their attachment to the end rings 4. Hence there is a potential (significant) problem with differential radial growth (thermal and centrifugal) between the end rings and the core.
- c) Any banding system has to be pre-tensioned to eliminate problems due to centrifugal growth and loss of dynamic balance.
- d) The thermal expansion coefficients of the steel laminations and the copper end ring material are mismatched by a factor of at least 2. The thermal expansion coefficient of carbon fibre (if used as a banding) is substantially less than for both steel and copper.

In view of the problems with this conventional high speed induction machine construction, an alternative has been proposed generally illustrated in FIG. 2. This approach is described in U.S. Pat. No. 5,512,792 and European Patent No. 0609645. Referring to FIG. 2, it will be seen that radial laminations in the form of a rotor core 23 are presented between end rings 24 with rotor bars 21 extending in slots 22 between these end rings 24. The core 23 and end rings 24 are clamped together using steel end plates and tie bars which pass through both the laminations of the core 23 and the end rings 24. It will be noted that there is no through shaft passing through the centre of the rotor core 23 in comparison with shaft 5 in FIG. 1. Instead of such a shaft, the end plates 25 are shaped with integrally formed and forged stub shafts. The end rings 24 in such circumstances have previously comprised copper alloy discs. These discs are usually machined from copper plate. The maximum stress in the end rings 24 is limited by the fact that the end rings do not have a central hole for a shaft upon which the core 23 is rotated. In such circumstances, in the absence of special provision in the rotor clamping system, the end rings 24 are subject to thermal expansion, which is about twice that of the steel laminations of the core 23. This significant differential thermal growth may therefore be present in the end regions and hence there is a potential for breakage of the constrained rotor bars 21. Furthermore, long term stability and dynamic balance of the rotor 23 relies upon the continued clamping pressure within the rotor core 23. Thus, this clamping pressure must be maintained throughout the rotor life at all times and at all rotor speeds. It will be appreciated that this is difficult to achieve.

SUMMARY OF THE INVENTION

In accordance with the present invention, there is provided an electrical machine comprising a laminated rotor core with rotor bars extending there through and end rings for structural integrity, each end ring comprising slots to receive the rotor bars and including a clamp section, the clamp section of the end ring is retained between an inner clamp ring and an outer clamp ring.

Also in accordance with the present invention, there is provided an end ring assembly for an electrical machine, the assembly comprising an end ring with slots for rotor bars and a clamp section for retention by a clamp ring arrangement, the clamp ring arrangement comprising an inner clamp ring and an outer clamp ring which when in juxtaposed position form a clamp cavity to retain the clamp section of the end ring.

The clamp section of the end ring may be enlarged and in the preferred embodiment of the present invention the clamp section and the cavity have a reciprocal dove tail shape.

Typically, the rotor bars are hollow. Furthermore, these hollow rotor bars may be expanded within the slots for retention.

Normally, the end ring is formed from copper or copper alloy.

Typically, the clamping rings are formed from a ferritic steel.

Normally, the rotor core is secured upon a shaft.

Generally, there is an interference fit between the rotor bars and the end rings. Furthermore, there is an interference fit between the clamp rings and the shaft.

Generally, the inner clamp ring encloses the rotor bars to minimise windage. Alternatively, the space between the inner clamp ring and the clamp bar is filled. Possibly, the rotor slots are fully closed in order to further reduce rotor core windage upon rotation.

Also in accordance with the present invention, there is provided a method of forming an electrical machine comprising:
- a) securing a first inner clamp ring towards one end of a shaft;
- b) locating a laminated core upon that shaft against the first secured inner clamp ring;
- c) securing a second inner clamp ring to the other side of the rotor core upon the shaft whereby the core is under axial compression along the shaft;
- d) locating rotor bars in slots of the rotor core;
- e) locating end rings in abutment with the respective inner clamp ring, with the ends of the rotor bars located in slots of each respective end ring;
- f) locating outer clamp rings in a juxtaposed position with a respective end ring with a clamp section of each end ring clamped between the respective inner clamp ring and a respective outer clamp ring; and,
- g) electrically and mechanically joining the end rings with the rotor bars.

The rotor bars may be electrically and mechanically joined to the end rings by brazing or solder or welding.

Possibly, where hollow rotor bars are used, those rotor bars are hydraulically expanded to improve retention of the rotor bars in the slots of the rotor core.

Typically, the inner and outer clamp rings are secured together by appropriate means. Typically, such appropriate means includes bolts.

BRIEF DESCRIPTION OF THE DRAWINGS

An embodiment of the present invention will now be described by way of example and with reference to the accompanying drawings.

FIG. 3 is a cross-sectional view of rotor core assembly for an electrical induction machine in accordance with the present invention and;

FIG. 3A is a perspective sectional view of FIG. 3.

DETAILED DESCRIPTION OF THE INVENTION

Figure 1:
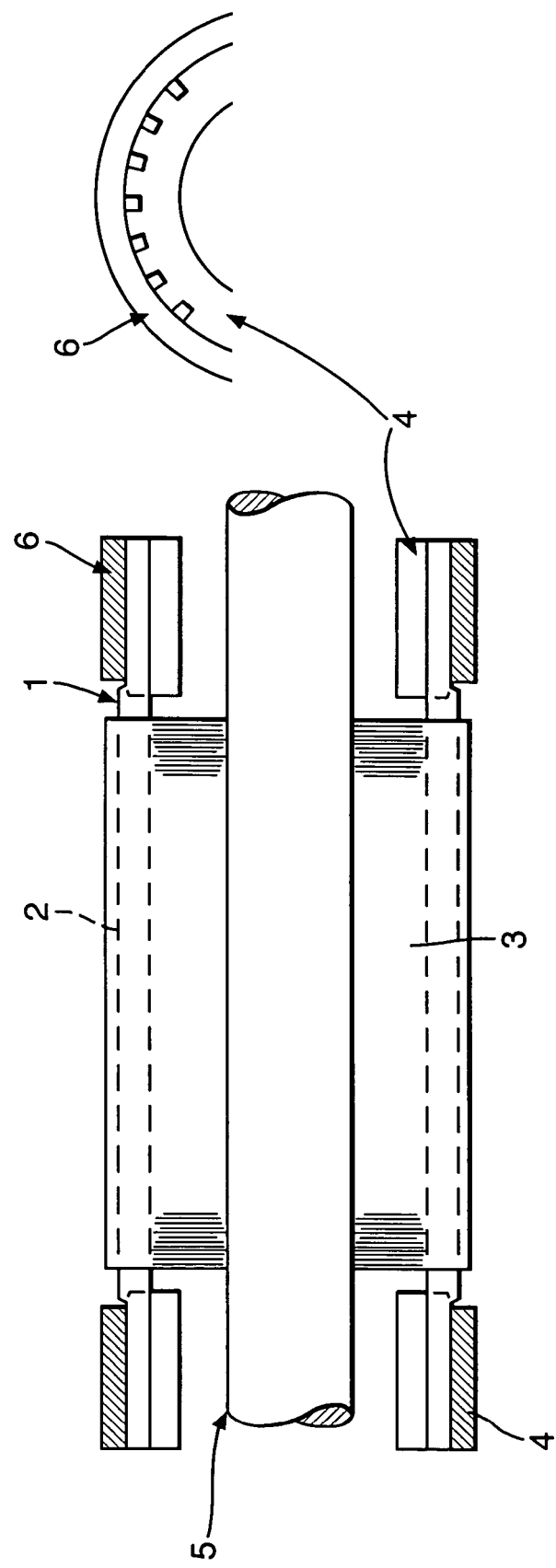
FIG. 1 is a cross-sectional view of a rotor core assembly of a conventional electrical induction machine.
Figure 2:
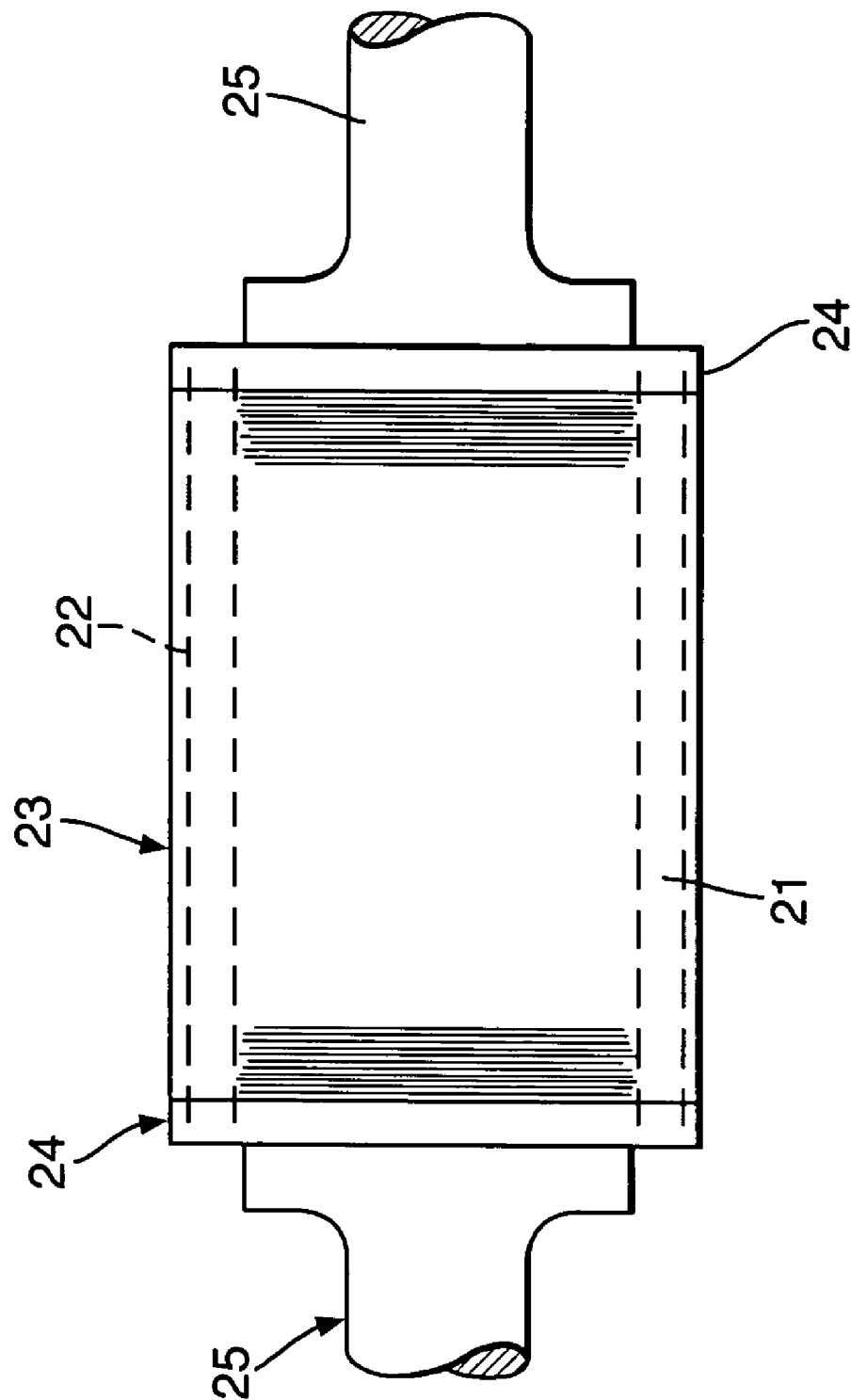
FIG. 2 is a cross-sectional view of a rotor core assembly for an alternative electrical induction machine to that shown in FIG. 1.

FIG. 3 illustrates a rotor core assembly 30 in accordance with the present invention. A laminated rotor core 33 is secured upon a through shaft 35 with end ring assemblies. Rotor bars 31 extend through slots 32 in the core 33. At either end these rotor bars 31 are secured to end rings 34. Typically, the rotor bars 31 are hollow drawn copper bars whilst the end rings 34 are formed from a copper alloy. In accordance with the present invention, these end rings 34 include clamping sections 36 which have a dove-tail cross-section. As will be appreciated, the end rings 34 extend around the shaft 35 and as illustrated include slot ends 42 to which ends of the rotor bars 31 are secured.

In accordance with the present invention, the clamp section 36 in the form of dove tail sections are clamped between respective inner clamp rings 37 and outer clamp rings 38. These clamp rings 37, 38 include V sections which, when there is juxtaposed association between the rings 37, 38, form a cavity in order to retain the clamp section 36 of the end rings 34.

The inner clamp ring 37 is secured upon the shaft 35 through a shrink fit interference process in order to provide axial location and effective clamping of the ring 37 on the shaft and therefore, the core 33 about that shaft 35.

The rotor bars 31 as indicated are located within slots 32 about the circumference of the core 33. Once located within the slots 32, the ends of the rotor bars 31 are joined to the end rings 34 by an appropriate method to ensure electrical continuity between those bars and the ring 34. Typically, they are joined by welding or brazing or soldering.

As indicated above, typically, the rotor core 33 is formed from steel laminations, which are punched in order to provide the fully closed rotor slots 32. By such an arrangement, the outer surface of the rotor core 33 is smooth which upon rotation provides lower windage resistance losses to such rotation. Furthermore, fully closed slots 32 increase the mechanical strength and integrity of the rotor core 33.

The rotor bars 31 are typically hollow drawn copper bars. By appropriate hydraulic expansion, the bars 31 can gradually expand in order to further improve electrical and mechanical retention of the rotor bars 31 in the slots 32 of the core 33. Hydraulic expansion prevents thermal or mechanical movement between the bars 31 and the core 33, which through the operational cycles may cause fretting of the inter-engaging surfaces between those bars 31 and the slot 32 surfaces. Where hydraulic expansion is used it will be appreciated that round bars 31 and round slots 32 are preferable in comparison with other bar and slot cross-sections.

As a practicality, it will be appreciated that the cross-sectional area of the end rings 34 will be chosen such that the end rings 34 have an electrical current density similar to that of the rotor bars 31 secured around the core 33.

Typically, copper alloy is used with regard to formation of the end rings 34. Normally, this copper alloy is a copper chrome alloy with a yield stress in the order of 250 to 300 Newtons per square millimeter. Rotational stresses presented to the end rings 34 and clamping rings 37, 38 may be estimated by two-dimensional axisymmetric finite element analysis to determine the necessary properties of materials and how the components best structurally formed in order to be effective within an operational electrical machine. For appropriate support within an electrical machine, typically, the range of growth of each end ring 34 will be determined in terms of thermal and centrifugal expansion but this radial growth will be dominated by the greater mechanical strength of the clamp rings 37, 38. In such circumstances, no significant differential growth occurs between the end rings 34 and the core 33 due to the anchoring effect of the clamp rings 37, 38. Furthermore, the properties of copper in the rotor bars 31 whether they be solid or hollow will allow a degree of flexibility.

The rotor core assembly 30 depicted in FIG. 3 rotates at high speed in operation within an electrical machine. Thus, windage problems must be considered in an operational design. In such circumstances, the exposed portion of the rotor bars 31 between the ends 39 of the core and end rings 34 will generally be shielded with a low density plastic filler 44. For example, this filler 44 may be a glass reinforced epoxy bandage. The purpose of shielding is to reduce rotor windage losses. Alternatively, the inner clamp ring 37 may be configured to extend radially to a flush circumferential perimeter surface with the rotor core 33. In order to achieve this flush relationship between the outer surface of the inner clamp ring 37 and the core 33, these rings 37 will include clearance holes to accommodate the rotor bars 31.

For best performance, the clamp rings 37, 38 are made from an alloy with high electrical resistivity. Such high electrical resistivity will minimise electrical eddy current losses in the end regions of the rotor core assembly 30. An example of such a high electrical resistivity material is a ferritic steel with a similar thermal expansion coefficient to the steel utilised in the rotor core 33 laminations. Such an approach minimises any potential problems of differential radial expansion between the core 33 and the clamp rings 37, 38. It will be understood that temperature differentials between the clamp rings 37, 38 and the core 33 are avoided by the relatively close proximity of those rings 37, 38 to the rotor core 33.

The present invention provides a high speed rotor assembly for electrical induction generators in which there is adequate support for the end rings 34 whilst only using conventional materials such as copper chrome alloy for the end rings 34 and ferritic steels for the clamp rings 37, 38. In such circumstances, more expensive materials are not required to achieve desired operational performance. Furthermore, it is not necessary to reinforce the end ring assembly with additional features such as banding as shown in FIG. 1. The present rotor core assembly configuration can be accommodated within a conventional through shaft rotor design without significant modification. In such circumstances, it may be possible to upgrade existing induction generators with the present invention. It will also be understood that the present invention minimises problems with respect to differential radial growth between the core 33, and rings 34, and clamp rings 37, 38 such that the possibility for rotor bar 31 breakage is reduced.

It will be understood that fabrication of a rotor core assembly in accordance with the present invention should be relatively simple to reduce fabrication costs. Thus, in accordance with the present invention, a routine similar to that outlined below will be utilised. It will be understood that within the basic process steps of the method outlined below, different fabricators may perform further additional functions as required by their specific needs.

Initially, all the components of the present rotor core assembly will be fabricated in terms of shaping and punching of slots etc. As part of this fabrication process, determination will be made as to the necessary material properties required by the fully operational high speed induction generator incorporating the rotor assembly core in accordance with the present invention. As a first step of manufacture, a first inner clamp ring 37 will be located at one end of a shaft 35. The first inner clamp ring 37 will typically be secured by an interference fit at the appropriate location on the shaft 35 such that there is robust axial location of that clamp ring 37 on the shaft 35. It will be appreciated that this first clamp ring 37 essentially establishes the rotor core 33 position on the shaft 35. Thus, the rotor core 33 is located upon the shaft 35 as the next step of assembly manufacture. Normally, there is a slight interference fit due to shrinkage association by the core 33 upon the shaft 35 through a central aperture of that core 33. Such slight interference location will ensure good radial location of the core 33 upon the shaft 35 when rotated at full speed in operation.

The next step of manufacture involves securing a second inner clamp ring 37 at the other end of the core 33. The second inner clamp ring 37 is secured to the shaft 35 with an interference fit such that the core 33 is under axial compression.

Once the inner clamp rings 37 are secured upon the shaft 35 with the rotor core 33 under axial compression, the rotor bars 35 are inserted through the slots 32 in the core 33. Where the inner clamp rings 37 extend to be flushed with the core 33 in order to reduce rotation windage problems, then the bars 31 also pass through the apertures in those clamp rings 37.

Once the rotor bars 31 are located within the slots 32 of the core 33, then the end rings 34 are located over the ends of those bars 31 at an appropriate position. This position is normally dictated by the dove-tail clamp ends 36 engaging a cavity recess part of the inner clamp ring 37. End rings 34 are located at both sides of the core 33 and typically a portion of each rotor bar extends beyond its slot in the end ring 34. Normally, the end rings 34 are temporary clamped to the inner clamp ring 37 to hold them in place whilst the rotor bars 31 are electrically connected to the end rings 34. This electrical connection is usually through a brazed or soldered or welded joint. Alternatively, there is an interference fit between the bars and the end rings. The interference fit could be achieved by hydraulically expanding the rotor bars or by swaging.

As indicated previously, it is preferable to hydraulically expand the rotor bars 31 in the slots 32. Thus, a temporary hydraulic hose is secured to one or both ends of the bars 31 to enable hydraulic expansion of each bar 31 either in turn or collectively in order to achieve good location of the bars 31 within the slots 32 of the core 33. It will be understood in order to achieve this hydraulic expansion, the bars 31 must be hollow and one end plugged whilst the other is connected to hydraulic pressure or both ends may be presented with such hydraulic pressure through appropriate couplings.

Once the rotor bars 31 are secured within slots 42 of the end rings 34, any excess bar 31 length which extends beyond the slots 32 of the rings 34 will be removed. Furthermore, when hollow, these bars 31 will then be plugged at their ends in order to avoid potential windage problems with open apertures.

Finally, outer clamp rings 38 are now presented along the shaft 35 and secured in position. These outer clamp rings 38 include a reciprocal recess to clamp a dove tailed clamp section 36 of the end rings 34 in a cavity formed between the opposed recesses of the inner clamp rings 37 and the outer clamp rings 38. The outer clamp rings 38 are then secured to the inner clamp rings 37. Typically, the clamp rings 37 and 38 are secured by bolts, which extend therebetween but alternative arrangements may be used.

Compliance is provided by the exposed parts of the bars 31 between the ends 39 of the core and the end rings 34. The length of the exposed parts of the bars 31 may be adjusted to provide increased compliance if necessary.

Where necessary, low-density plastic filler 44 will then be appropriately presented particularly about any exposed parts of the bars 31 between the ends 39 of the core 33 and the end rings 34 in order to avoid windage problems. Thus, a rotor core assembly 30 is formed which can then be used as part of a high-speed electrical induction generator with reduced problems with respect to thermal and centrifugal growth differentials between the various components of the assembly 30. Such reduced radial growth differentials will in turn reduce the potential for rotor bar 31 failure through breakage.

Various alternative modifications and variations may be provided. Thus, rather than provide dove tailed clamp sections as describable with respect to FIG. 3, it will be appreciated that other bulbous cross sections between a clamp section and cavity formed between the inner and outer clamp rings may be used. Thus, the clamp section may be bell shaped or bulbous or have a tee cross section. Furthermore, rather than simply depend upon a bolt or other association between the outer ring 38 and the inner ring 37, that outer ring 38 may also be secured to the shaft 35 through an interference fit, that is to say shrinkage of the clamp ring 38 upon the shaft 35.

I claim:

1. An end ring assembly for an electrical machine, the assembly comprising an end ring with slots for rotor bars and a clamp section, the clamp section of the end ring is retained between an inner clamp ring and an outer clamp ring which in juxtaposed position form a clamp cavity to retain the clamp section of the end ring wherein the rotor bars are hollow and are expanded within the slots for retention.

2. An end ring assembly for an electrical machine, the assembly comprising an end ring with slots for rotor bars and a clamp section, the clamp section of the end ring is retained between an inner clamp ring and an outer clamp ring which in juxtaposed position form a clamp cavity to retain the clamp section of the end ring wherein the clamp section of the end ring is enlarged.

3. An end ring assembly for an electrical machine, the assembly comprising an end ring with slots for rotor bars and a clamp section, the clamp section of the end ring is retained between an inner clamp ring and an outer clamp ring which in juxtaposed position form a clamp cavity to retain the clamp section of the end ring wherein the clamp section and the clamp cavity have a reciprocal dove tail shape.

4. An assembly as claimed in claim 1, wherein the end ring is formed from copper or copper alloy.

5. An assembly as claimed in claim 1, wherein the clamping rings are formed from a ferritic steel.

6. An assembly as claimed in claim 1, wherein the rotor core is secured upon a shaft.

7. An assembly as claimed in claim 1, wherein there is an interference fit between the rotor bars and the end ring.

8. An assembly as claimed in claim 1, wherein there is an interference fit between the clamp ring and the shaft.

9. An assembly as claimed in claim 1, wherein the inner clamp ring encloses the rotor bars to minimise windage.

10. An assembly as claimed in claim 1, wherein the space between the inner clamp ring and the rotor bars is filled.

11. An assembly as claimed in claim 1, wherein the slots are fully closed in order to further reduce rotor core windage upon rotation.

\* \* \* \* \*